United States Patent [19]

Slater

[11] 3,971,533

[45] July 27, 1976

[54] CONVERTIBLE AIRSHIP

[76] Inventor: Saul I. Slater, 1427 W. 22 St., Sunset Island 4, Miami Beach, Fla. 33140

[22] Filed: Feb. 25, 1975

[21] Appl. No.: 552,793

[52] U.S. Cl. ................................ 244/30; 244/93
[51] Int. Cl.² ........................................ B64B 1/38
[58] Field of Search ............................ 244/25–31, 244/93, 115, 127, 24

[56] References Cited
UNITED STATES PATENTS

| 7,207 | 3/1850 | Bell ........................... 244/30 |
| 804,593 | 11/1905 | Friedel ....................... 244/93 |
| 1,074,830 | 10/1913 | Blochmann .................. 244/93 |
| 1,430,393 | 9/1922 | Lynde ......................... 244/30 |
| 1,664,565 | 4/1928 | Mammen ..................... 244/30 |
| 2,038,671 | 4/1936 | Olan ........................... 244/30 |
| 2,070,854 | 2/1937 | Boyes .......................... 244/24 |

FOREIGN PATENTS OR APPLICATIONS

| 706,419 | 6/1931 | France ......................... 244/25 |
| 87,811 | 1/1894 | Germany ..................... 244/30 |
| 2,057,287 | 3/1972 | Germany ..................... 244/25 |
| 504,525 | 11/1926 | Germany ..................... 244/25 |
| 185,661 | 9/1922 | United Kingdom ........... 244/25 |

Primary Examiner—Trygve M. Blix
Assistant Examiner—Galen L. Barefoot
Attorney, Agent, or Firm—Morgan, Finnegan, Pine, Foley & Lee

[57] ABSTRACT

A flexible lighter-than-air gas-containing envelope carries at least one rigid structural member which provides a track for pivotal and slidable mounting of a gondola. The track extends along the underside of the airship from the nose section to a point aft of the midsection so that the gondola can be positioned from a point directly under the belly to one at the nose, causing the longitudinal axis of the envelope to rotate through 90°. Remote controls actuate the rudders, ailerons and elevators as well as fully rotatable horizontal stabilizers and wings.

21 Claims, 14 Drawing Figures

CONVERTIBLE AIRSHIP

BACKGROUND OF THE INVENTION

The present invention relates to lighter-than-air gas-containing airships and more particularly to airships convertible from a generally horizontally extending configuration, such as in a conventional blimp or dirigible, to a generally vertically extending configuration.

Balloons, blimps and zepplins have captured the fancy of man since he first aspired to fly. These airships combine desirable characteristics from the standpoint of aerodynamics, travel economy and ecology. Lighter-than-air vehicles can remain aloft indefinitely and are capable of touching down in areas which would be inaccessible for most other conventional transport vehicles. They can be powered by a simple propeller engine and refueling can be accomplished either directly from the ground or by means of a simple umbilical cord from another aircraft.

Lighter-than-air airships provide an inexpensive and environmentally inoffensive means of transporting people or cargo. Unfortunately, rigid frame zepplins are virtually obsolete and, among currently utilized airships, blimps have been relegated to use for advertising and promotional campaigns while balloons find frequent use by fanciful daredevils in attempted uncontrolled — and usually unsuccessful — record free-air flights.

People have been reticent since the late 1930's to pursue flight by lighter-than-air vessels, after the "Hindenburg" was mysteriously and spectacularly consumed by flames. However, with little modification of old designs — most notably through the use of inert helium gas rather than flamable hydrogen — the airship can be a most useful advance in the field of transportation. One disadvantage to current airships, which the present invention overcomes, is their bulky front to rear size which necessitates large ground area in order to accommodate loading, unloading and refueling.

SUMMARY OF THE INVENTION

It is therefore a primary object of the present invention to provide an airship which can be converted from a generally horizontal configuration to a generally vertical configuration. It is also an object to provide this airship with propeller means adapted to prevent significant drift while the airship is in a generally vertical configuration or while the airship is rotating to or from a generally vertical configuration.

It is also an object of the present invention to provide an airship having a gondola which can be located at various positions with respect to the gas-containing envelope so that the airship can be oriented at any angle to accommoate different wind conditions.

It is a further object of the present invention to provide an airship with the capability of conversion from generally dirigible-like to generally ballon-like in both all-fabric and rigid-frame/fabric airships.

It is yet another object of the present invention to provide an airship capable of touch down in places of limited area.

The present invention relates to airships and more particularly to rigid-frame/fabric and all-fabric lighter-than-air airships convertible from a substantially horizontal configuration to a substantially vertical one. The airship is provided with at least one structural member forming a track along its belly. The gondola or carriage of the airship is affixed to the track so that the gondola can "roll" from a position under the belly of the gas enclosure when its longitudinal axis is horizontal, to any position along the track until the gondola is positioned at the nose of the gas housing when the longitudinal axis has been rotated to a completely vertical orientation. The gondola has support members by which it is attached to the track by rollers at the end of these members. The gondola can be moved along the track by a winch and rope arrangement or any other suitable meaans for positioning it along the track.

The airship according to the present invention provides an apparatus having the recognized advantages of lighter-than-air vehicles with the additional feature of permitting simple, inexpensive and safe loading, unloading and fueling such as currently practiced at airports and docks. With the convertibility to a generally ballon-like configuration, the airship can touchdown in areas of limited access to load, unload or refuel. Furthermore, the airship according to the present invention can be loaded and unloaded directly at the actual point of origin, and the point of ultimate destination of the cargo, thus eliminating the need for intermediate storage or distribution facilities. These and other features, objects and advantages of the present invention will become more evident when the detailed description is considered in light of the drawings in which:

DETAILED DESCRIPTION OF THE PREFERRED EMBODIMENT

Figure 1:
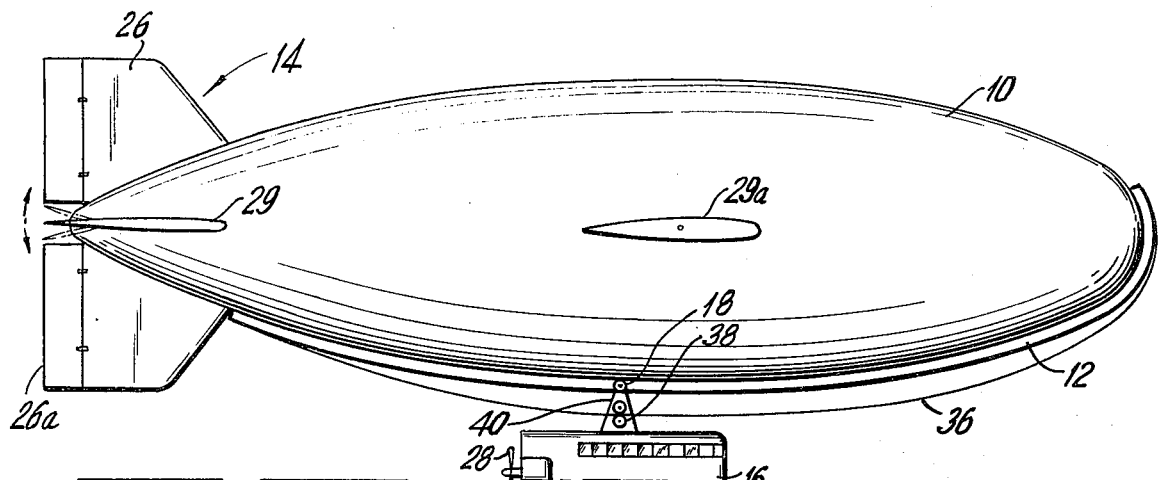
FIG. 1 is a side view of an airship according to the present invention with its longitudinal axis horizontal.
Figure 2:
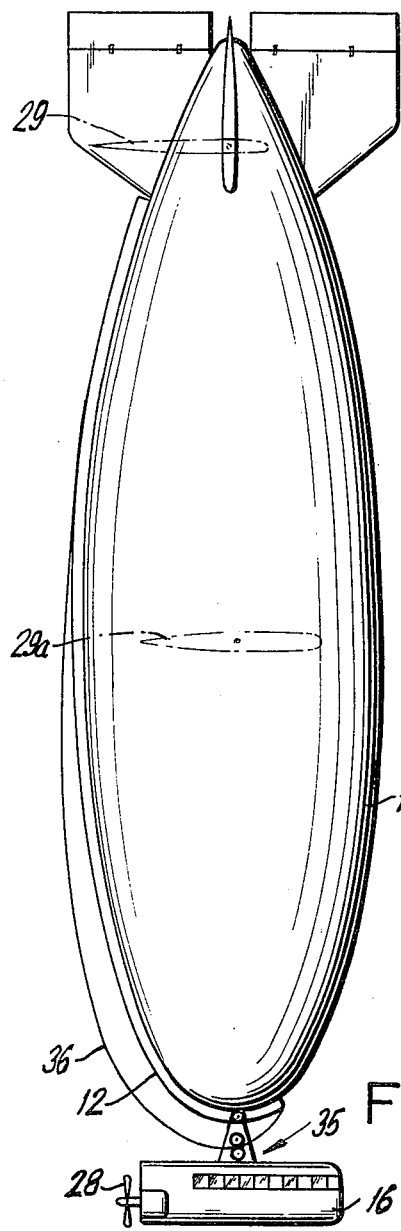
FIG. 2 is a side view of an airship according to the present invention with its longitudinal axis vertical.
Figure 4:
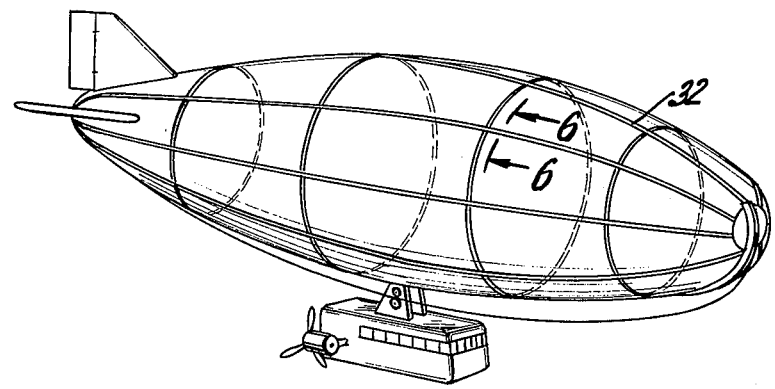
FIG. 4 is a perspective view of the outer skin support structure for an airship employing the present invention.
Figure 7:
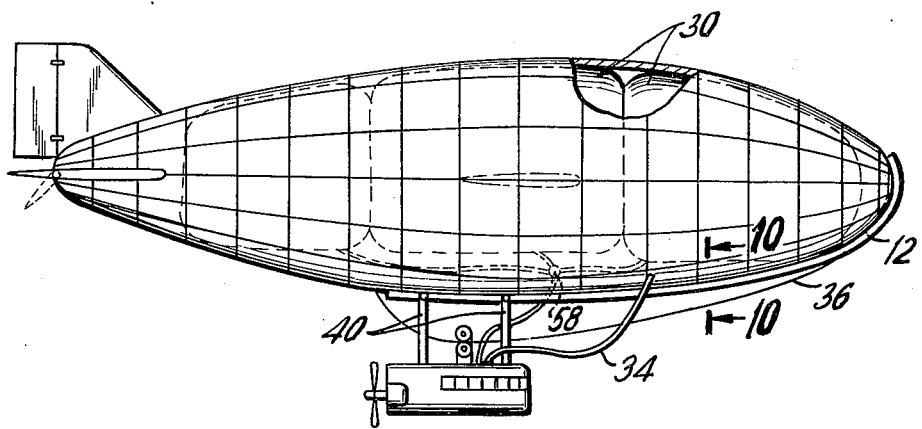
FIG. 7 is a side view of an airship having multiple support members affixed to one or more structural/track members.

FIGS. 1 and 2 show an airship according to the present invention exhibiting its principal advantages. The airship according to the invention comprises gas-containing envelope 10 adapted to contain a lighter-than-air gas. Envelope 10 may be a substantially all-fabric blimp whose shape is maintained through internal gas pressures as shown in FIG. 7 or it may be a rigid-frame/fabric dirigible such as a fabric and girder zeppelin as shown in FIG. 4. The airship envelope 10 has rigid structural/track support member 12 mounted substantially along the underside of the envelope. Advantageously, structural/track member 12 extends from a point aft of the midsection to a point slightly above the nose of the gas envelope. Gondola 16 is pivotally and slidably mounted to structural/track member 12 by mounting means 18 which may form the upper end of gondola support member 40. Mounting means 18 is fitted onto structural/track member 12 such that gondola may "slide" laterally along member 12 and rotate about said mounting means at any point on member 12.

Figure 9D:
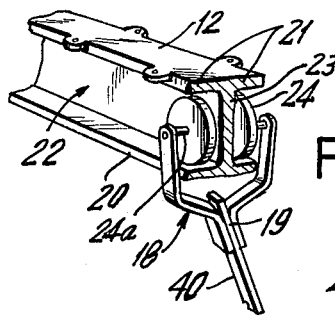
FIGS. 9a–9d are perspective views of structural/track members, mounting means and positioning means according to different aspects of the present invention.
Figure 9A:
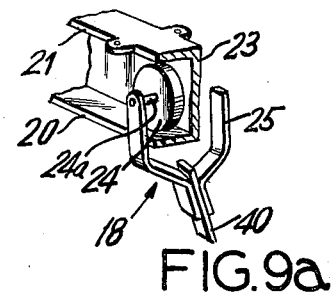

Referring now to FIG. 9a, structural/track member 12 may be a channel beam having web section 23, extended lower flange 20 and upper flange 21. Mounting means 18 comprises roller means 24, on axle means 24a, which rides on the upper surface of flange 20. Bracing means 25 which may be a vertically oriented post is formed on yoke or cradle 19 portion of support member 40. Bracing means 25 is preferably maintained in close proximity to web 23 in order to steady gondola 16 as it slides and/or pivots and to prevent mounting means 18 from becoming disengaged from structural/track member 12. Alternatively, bracing means 25 may include second roller means 27 having its axis of rotation substantially parallel to web 23 as shown in FIG. 9b in order to allow substantially frictionless movement of the gondola as it slides and/or pivots with respect to member 12.

Figure 9B:
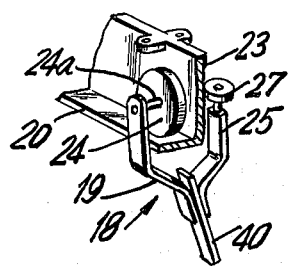
Figure 10:
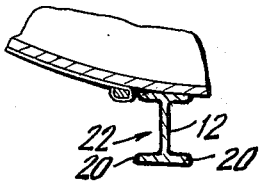
FIG. 10 is an enlarged view taken along section 10—10 of FIG. 7.

According to another aspect of the present invention, structural/track member 12 can be an angle beam having web 23 and flange 20 as shown in FIG. 9b. Mounting member 18 may be substantially similar to that described for use with the channel beam. It is particularly useful for this embodiment that cradle 19 of mounting member 18 be formed so as to ride close to the bottom of lower flange 20 in order to prevent roller 24 of mounting member 18 from rising to either puncture the gas envelope or "derail" from the track.

Figure 9C:
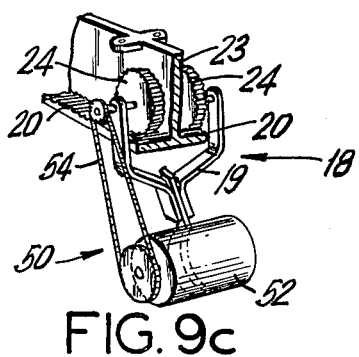

Alternatively, structural/track member 12 can be a T-beam including web 23 and two flanges 20 as shown in FIG. 9c. Mounting means 18 can comprise a double roller cradle 19 having two roller means 24 which ride, one each, on the two flanges 20. As discussed above with reference to FIG. 9b, the cradle 19 may be formed close to the bottom of beam flanges 20 in order to prevent puncture of the gas envelope.

In the preferred embodiment, as depicted in FIG. 9d, structural/track member 12 comprises an I-beam comprising web section 23, two upper flanges 21 and two lower flanges 20. Two channels 22, separated by web 23, are defined in the I-beam to accommodate two roller means 24 for mounting the gondola onto track member 12. Thus, the gondola is capable of both pivotal and slidable movement with respect to the gas envelope as shown in FIGS. 1 and 2. Cradle 19 of mounting means 18 may be formed in any convenient configuration since upper flanges 21 contain the mounting member 18 to prevent puncture of envelope 10.

Figure 3A:
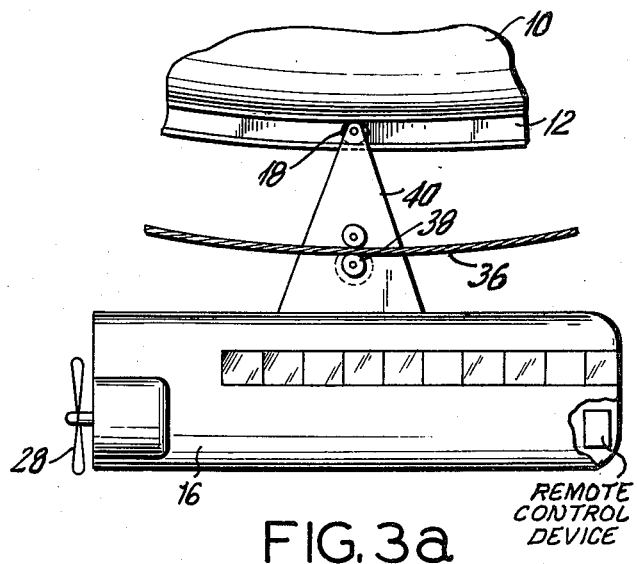
FIGS. 3a–3b are side views showing one mounting means and one positioning means according to one aspect of the present invention.
Figure 3B:
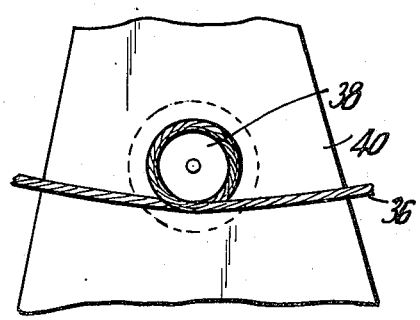

In order to control the flight of an airship according to the present invention, the airship is provided with tail wing assembly 14 comprising at least one vertical stabilizer 26 and two horizontal stabilizers 29 which can be formed with rudders and ailerons respectively. Advantageously, the operable portions of the tail wing assembly may be remotely controlled by remote control means (illustrated in cut-away in FIG. 3a) from the gondola.

In a particularly useful embodiment of the present invention, the horizontal stabilizers may be completely pivotally attached to the gas envelope, as shown in FIG. 2, for enhancing the stability of the airship. Accordingly, while the gondola traverses from its "normal" position below the belly of gas-containing envelope 10 (to rotate the longitudinal axis of the gas envelope), the horizontal stabilizers can be simultaneously rotated through 90° such that their axes remain substantially parallel to the ground or to the wind velocity thereby lending additional stability to the vertically extending gas envelope, especially during its rotating maneuvers. Advantageously, wings 29a may be added to the airship, and pivotally mounted to envelope 10, as shown by FIGS. 1–2. Wings 29a may be rotated substantially synchronously with the horizontal stabilizers to further enhance the airship's stability. Furthermore, when envelope 10 is oriented in or is being reoriented to a vertical configuration, propulsion means 28 may be continuously operated so as to assist maintaining the airship in a substantially stationary posture. This is particularly useful to prevent appreciable drift of the airship when preparing to load or unload, or while performing its maneuvers.

Figure 5:
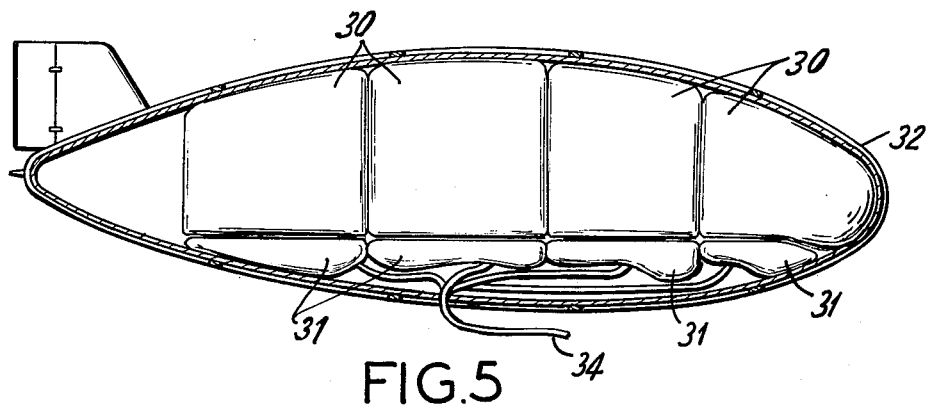
FIG. 5 is an internal view of the gas bag system of an airship.
Figure 6:
FIG. 6 is an enlarged view taken along section 6—6 of FIG. 4.

Whether the airship is a rigid frame-fabric gas envelope as shown in FIG. 4 or an all-fabric gas envelope as shown in FIG. 7, gas-containing envelope 10 may house gas bags 30 fitted therein. Gas bags 30 are adapted to contain the lighter-than-air gas, such as helium, to provide the buoyancy for lifting the airship. The airship's ascent and descent is governed by manipulating the effective density of the gas contained by bags 30 and suitable means are included in the airship to accomplish this. Accordingly, envelope 10 may be formed with airtight outer skin 32 and connected to a source of air or other suitable "heavy" gas (hereinafter referred to as air) by umbilical cord 34. Airship descent is effected by forcing the air through conduit 34 into outer skin 32. The pressure generated by the introduced air compresses gas bags 30 to increase the effective density of the lighter-than-air gas in the bags. The buoyancy of the airship is thereby reduced, causing a loss in altitude. Alternatively, airtight bags 31 may be provided within envelope 10 for receiving the air through branches of conduit 34 as shown in FIG. 5. This is particularly useful in maintaining control of the airship despite any damage which may have been suffered by the outer skin.

Likewise, when ascent is desired, the air is evacuated from envelope 10, or air bags 31, to relieve the pressure on gas bags 30. The gas within gas bags 30 expands, thereby reducing the effective density of that gas to increase buoyancy of the airship.

In normal operation, gondola 16 is positioned substantially mid-way under the belly of the gas envelope to maintain the airship in substantially horizontal equilibrium during flight. The airship is driven by propulsion means 28 which can be either a simple propeller engine or turbopropeller-engine.

When the airship according to the present invention has reached its destination, gondola 16 may be moved laterally along structural/track member 12 toward the airship's nose by positioning means 35. As the gondola travels along track member 12, the longitudinal axis of gas-containing envelope 10 rotates towards a substantially vertical orientation.

According to one aspect of the present invention, positioning means 35 is connected to gondola 16 to govern its position along structural/track member 12. Positioning means 35 may comprise cable 36 and winch means 38. Cable 36 may be conveniently affixed to envelope 10 such as by attachment to the two ends of track member 12. Furthermore, cable 36 may be substantially taut to prevent drift of gondola 16 vis-a-vis track member 12.

Winch means 38 acts on cable 36 to pull gondola 16 along member 12 via mounting means 18 which may comprise a combination of roller means 24 and axle means 24a, As gondola 16 nears the nose of gas-containing envelope 10, mounting means 18 allows pivoting of gondola 16 about its point of contact on member 12 such that gondola 16 remains substantially horizontal. In operation, as gondola 16 moves along structural/track member 12 via mounting means 18, the action of the shifting positions of the gondola's weight, which may be represented as a point load acting on member 12, causes the gas-containing envelope 10 to rotate its longitudinal axis continuously until the gondola reaches the section of member 12 adjacent the nose at which time the longitudinal axis is substantially vertical.

According to another aspect of the present invention, positioning means 35 may comprise non-slip interface between roller means 24 and flanges 20 having a non-slip interface therebetween which may be in the form of cooperating teeth formed on both roller means 24 and the upper surfaces of each flange 20 as shown in FIG. 9c. Alternatively, positioning means 35 may comprise a high friction roller-flange interface such as by rubberized roller means 24 abutting a roughened upper surface of each flange 20. According to either embodiment, roller means 24 may be rotated by any convenient drive means 50. Drive means 50 may comprise either a conventional chain-drive motor means 52–54 which rotates roller means 24 as shown in FIG. 9c, or it may be a direct drive motor connected directly to roller means 24.

Figure 8:
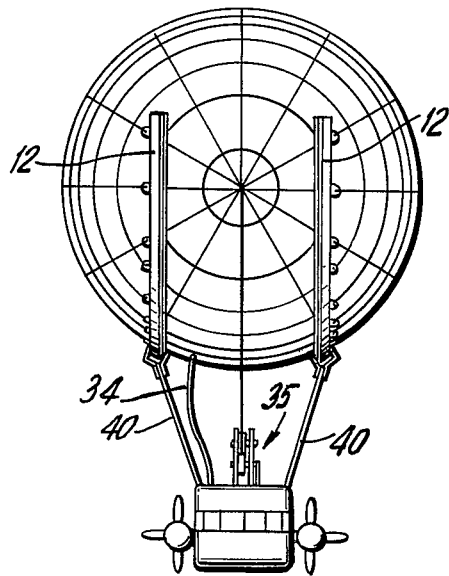
FIG. 8 is a front view of an airship according to the present invention having two structural/track members.

FIGS. 7 and 8 depict another aspect of the present invention in which gas-containing envelope 10 may be provided with two structural/track members 12 and gondola 16 is formed with multiple support members 40, each provided with a mounting assembly 18, as described above with reference to FIGS. 9a–9d, for mounting the gondola to the structural/track members. This is particularly useful for large capacity airships which can accommodate heavy cargo. Advantageously, the gondola may be provided with four support members 40 on the two structural/track members to prevent any substantial forward-to-aft or side-to-side pitching of the gondola due to gusting winds etc. during flight.

In operation, the gondola rides below the belly of the gas envelope as in a common dirigible or blimp such that the longitudinal axis of the gas-containing envelope 10 is generally parallel to the ground. Should the airship encounter high winds, the gondola may be moved forward or backward of the normal equilibrium point to give the airship an angle of attack, negative or positive, with respect to air flow to enhance stability during flight.

The airship according to the present invention is particularly adapted for convenient refueling, loading and unloading at points of origin and ultimate destination, especially where such points are inaccessible by other conventional transport means. The gondola is brought forward to the nose of the airship, thereby rotating the longitudinal axis of the gas envelope to a substantially vertical orientation a shown in FIG. 2. With the gondola so positioned, the helium gas bags can be compressed by the introduction of air through umbilical cord 34, causing the airship to descend.

Alternatively, descent of the airship can also be effected by allowing the lighter-than-air gas to escape from gas bags 30. Accordingly, bleeding means which may be in the form of second umbilical cord assembly 58 shown in FIG. 7 may be connected to gondola 16 for controlling the quantity of gas in gas bags 30. This procedure for descent is particularly useful when gas envelope 10 and/or air bags 31 are damaged whereby altitude control would otherwise be lost, or when an emergency arises and rapid descent must be effected. Furthermore, this bleeding means can be utilized in reverse for filling gas bags 30.

As the airship is descending for a landing in accordance with one of the above-described procedures, gondola 16 may be landed directly on the ground or adjacent a loading platform by utilizing propulsion means 28 in conjunction with the ailerons and elevators provided on stabilizer assembly 14 to guide the airship to its proper landing position. In the alternative, the airship can be landed by simply lowering a tie-line to a landing crew which can have the airship pulled down to its proper landing position. Once in landing position, the airship can be anchored or suitably tied down for loading, unloading or refueling. Thus, passengers and/or cargo may be loaded or unloaded directly onto the gondola without necessitating additional equipment such as lowering and hoisting winches or shuttle craft. Furthermore, the present invention obviates the need for intermediate storage facilities and minimizes the necessity for subsequent transporting when used for shipping cargo.

As a further feature of the present invention, when the airship is landing or has landed and a strong wind prevails at the landing site, the airship can be stabilized by utilizing fully rotatable horizontal stabilizers 29, and rotatable wings 29a if present, in conjunction with propulsion means 28 to cut into the wind and stabilize the vertically extending envelope with respect to the air flow. In addition, the horizontal stabilizers and wings may be oriented with a negative angle of attack to urge the airship toward the ground and enhance its stability vis-a-vis the ground.

Those skilled in the art will recognize that certain changes or modifications may be made in the structure described above, without departing from the scope and spirit of the invention as defined in the appended claims.

What is claimed is:

1. A lighter-than-air airship which comprises:
   an elongated gas-containing envelope filled with lighter-than-air gas;
   stabilizer means mounted to said envelope for stabilizing the orientation of said airship;
   a gondola;
   remote control means in said gondola for operating said stabilizer means;
   propulsion means mounted to said gondola for providing propulsion capability to said airship to propel said airship during flight and stabilize said airship during maneuvering; and
   means for slidably and pivotally mounting said gondola to said envelope and for variably positioning said gondola with respect to said envelope to cause rotation of the longitudinal axis of said envelope from a generally horizontal orientation when said gondola is positioned generally at the midsection of said envelope to a generally vertical orientation when said gondola is positioned generally at the nose of said envelope, while said gondola retains a generally horizontal orientation, such that said airship assumes convenient landing characteristics when said longitudinal axis is generally vertical and said airship is capable of substantial flight when said longitudinal axis is generally horizontal.

2. An airship according to claim 1 wherein said means mounting gondola to said envelope includes:
a first structural/track member rigidly mounted to said gas-containing envelope extending generally from said nose section to a point generally aft of said midsection, said structural/track member being adapted to accommodate slidable and rotatable mounting of said gondola;
mounting means connected to said gondola for providing slidable and pivotal mounting of said gondola to said structural/track member; and
positioning means connected to said gondola for enabling said gondola to be positioned at substantially any desired point on said structural/track member.

3. An airship according to claim 2 wherein said structural/track member comprises a beam having a web section and at least one extended lower flange defining a channel between said flange and said web, and said mounting means comprises roller means and axle means, said roller means being adapted to fit within said channel to accommodate pivotal and slidable mounting of the gondola to said structural/track member.

4. An airship according to claim 3 wherein said positioning means comprises a winch connected to said gondola and a cable in windable relation with said winch, said cable having its ends affixed to said structural/track member substantially at its ends such that said winch pulls on said cable to position said gondola at substantially any point along said structural/track member whereby said envelope rotates in response to shifting weight distribution.

5. An airship according to claim 4 wherein said mounting means further comprises bracing means for preventing said mounting means from becoming disengaged from said structural/track member and from damaging said gas-containing envelope.

6. An airship according to claim 5 which further includes a plurality of gas bags within said envelope for containing said lighter-than-air gas.

7. An airship according to claim 3 wherein said roller means and said flange of said structural/track member are formed with cooperating non-slip interfaces and said positioning means comprises drive means connectable to said roller means for rotating said roller means with respect to said structural/track member such that said gondola moves laterally along said structural/track member.

8. An airship according to claim 7 wherein said mounting means further comprises bracing means for preventing said mounting means from becoming disengaged from said structural/track member and from damaging said gas-containing envelope.

9. An airship according to claim 8 which further includes a plurality of gas bags within said envelope for containing said lighter-than-air gas.

10. An airship according to claim 3 wherein said structural/track member includes at least two extended lower flanges and said roller means comprises two rollers, each roller being adapted to ride on one of said flanges.

11. An airship according to claim 10 wherein said positioning means comprises a winch connected to said gondola and a cable in windable relation with said winch, said cable having its ends affixed to said structural/track member substantially at its ends.

12. An airship according to claim 10 wherein said rollers and said flanges are formed with cooperating non-slip interfaces and said positioning means comprises drive means connectable to said roller means for rotating said roller means with respect to said structural/track member such that said gondola moves laterally along said structural/track member.

13. An airship according to claim 10 wherein said structural/track member further includes two upper flanges integral with said web, in the form of an I-beam having two channels defined by said web and flanges and said roller means is adpated to fit with said channels.

14. An airship according to claim 10 which further includes a plurality of gas bags within said envelope for containing said lighter-than-air gas.

15. An airship according to claim 3 which further comprises a second structural/track member rigidly mounted to said envelope substantially parallel to said first structural/track member and mounting means connected to said gondola and adapted to provide pivotal and slidable mounting of said gondola to said structural/track members.

16. An airship according to claim 15 which further includes four support members, each of said support members being provided with said mounting means for attaching said gondola to said structural/track member.

17. An airship according to claim 16 which further includes a plurality of gas bags within said envelope for containing said lighter-than-air gas.

18. An airship according to claim 3 wherein said stabilizer means comprises at least one vertical stabilizer and a pair of horizontal stabilizers mounted to said envelope at its aft section, said vertical and horizontal stabilizer being provided with a rudder and elevators respectively for providing side-to-side and up-and-down guidance to said airship, said rudder and elevators being remotely controlled by remote control means from said gondola.

19. An airship according to claim 18 which further includes connecting means for rotatably mounting said horizontal stabilizers to said envelope and wherein rotation of said horizontal stabilizers is controlled by remote control means from said gondola such that said horizontal stabilizers assist up-and-down guidance of said airship during flight and assist stabilizing said airship in landing.

20. An airship according to claim 19 which further comprises a pair of wings rotatably mounted to said envelope substantially at its midsection, said wings being remotely controlled by remote control means from said gondola such that said wings rotate to assist up-and-down guidance of said airship during flight and assist stabilizing said airship in landing.

21. An airship according to claim 20 which further includes a plurality of gas bags within said envelope for containing said lighter-than-air gas.

* * * * *